United States Patent
McGlinn et al.

(10) Patent No.: US 8,403,615 B1
(45) Date of Patent: Mar. 26, 2013

(54) VEHICLE LIFT BARRIER

(75) Inventors: Gerald P. McGlinn, Oshkosh, WI (US); William W. Belson, III, Hartland, WI (US); Richard A. Keller, Oconomowoc, WI (US)

(73) Assignee: Bruno Independent Living Aids, Inc., Oconomowoc, WI (US)

( * ) Notice: Subject to any disclaimer, the term of this patent is extended or adjusted under 35 U.S.C. 154(b) by 0 days.

(21) Appl. No.: 12/541,932

(22) Filed: Aug. 15, 2009

Related U.S. Application Data

(60) Provisional application No. 61/090,309, filed on Aug. 20, 2008.

(51) Int. Cl.
*B60P 1/02* (2006.01)

(52) U.S. Cl. ..................... 414/549; 296/24.43

(58) Field of Classification Search ............... 414/541, 414/549, 555; 296/24.43; 248/247, 248
See application file for complete search history.

(56) References Cited

U.S. PATENT DOCUMENTS

| | | | |
|---|---|---|---|
| 4,664,584 A * | 5/1987 | Braun et al. ............... | 414/541 |
| 4,690,364 A | 9/1987 | Constantin | |
| 4,754,946 A | 7/1988 | Constantin | |
| 4,919,467 A | 4/1990 | Guimelli | |
| 5,133,633 A | 7/1992 | Grata | |
| 5,234,307 A | 8/1993 | Scott | |
| D382,846 S | 8/1997 | Coogan et al. | |
| 5,735,564 A | 4/1998 | Coogan | |
| 5,951,235 A | 9/1999 | Young et al. | |
| 5,984,614 A | 11/1999 | Weber | |
| 6,059,313 A | 5/2000 | Coogan et al. | |
| 6,126,127 A * | 10/2000 | Riblet ..................... | 248/219.4 |
| 6,234,741 B1 * | 5/2001 | McDaniel ................ | 414/546 |
| 6,325,436 B1 | 12/2001 | Ehrenberger et al. | |
| 6,460,912 B2 | 10/2002 | Moore et al. | |
| 6,474,916 B2 | 11/2002 | Constantin | |
| 6,595,567 B1 | 7/2003 | Ament et al. | |

(Continued)

OTHER PUBLICATIONS

Adapt-Solutions #1 Ltd., "Lock-Solution" wheelchair anchor; Jan. 6, 2006 (4 pgs).

(Continued)

*Primary Examiner* — Saul Rodriguez
*Assistant Examiner* — Jonathan Snelting
(74) *Attorney, Agent, or Firm* — Sylke Law Offices, LLC; C. Thomas Sylke

(57) ABSTRACT

A vehicle lift barrier is adapted to be mounted to vehicle lifts and the like that assist in loading and unloading cargo and provide a storage environment in which cargo is less likely to migrate from a cargo area into a passenger seating area or compartment. A barrier composed of a barricade is mounted to a vehicle lift, in some cases example by mounting the barrier to a generally vertical post, mast or the like or mounting the barrier to a lift platform, allowing the lift to operate normally while the barricade obstructs all or a substantial portion of the passage between the motor vehicle storage/cargo area and the passenger area. Where the barrier is mounted to a vertical post or the like on a vehicle lift, cut-out bracketing can be used to mate with the outer cross-sectional shape of the post to inhibit pivoting of the barrier about the post. Other bracket profiles can be used to enhance the barrier's protective advantages. A wrap-around sheet metal bracket configuration creates two flanges per bracket to reinforce bracing and to provide securing belt mounting points for a given vehicle lift. Such barriers can be used in motor vehicles with rear and/or side access-ways where vehicle lifts typically are provided and do not require special tie-downs or other cargo securing means, making such devices especially useful in vehicles that might serve a number of different users and/or that might transport a variety of types of cargo and/or mobility devices.

18 Claims, 14 Drawing Sheets

U.S. PATENT DOCUMENTS

| | | | |
|---|---|---|---|
| 6,685,403 | B2 | 2/2004 | Constantin |
| 6,726,435 | B1 | 4/2004 | Williams et al. |
| 6,729,827 | B1 | 5/2004 | Williams et al. |
| 6,739,812 | B1 | 5/2004 | Pfeifer et al. |
| 6,796,589 | B2 | 9/2004 | Dolman |
| 6,827,382 | B2 | 12/2004 | Murray et al. |
| 6,837,666 | B1 | 1/2005 | Panzarella et al. |
| 6,962,382 | B2 | 11/2005 | Scarlett |
| 6,983,970 | B2 | 1/2006 | Bateman |
| 7,104,740 | B2 | 9/2006 | Girardin |
| 7,108,466 | B2 | 9/2006 | Panzarella et al. |
| 7,118,152 | B2 | 10/2006 | Cucknell et al. |
| 7,140,659 | B2 | 11/2006 | Walter et al. |
| 7,229,238 | B2 | 6/2007 | Girardin et al. |
| 7,284,944 | B1 * | 10/2007 | Schlangen ............. 414/541 |
| 7,287,796 | B2 | 10/2007 | Coles et al. |
| 7,300,085 | B2 | 11/2007 | Giumelli |
| 7,316,440 | B2 | 1/2008 | Walter et al. |
| 7,380,853 | B2 | 6/2008 | Wells |
| 7,396,202 | B1 * | 7/2008 | Panzarella et al. ........ 414/542 |
| 7,717,484 | B2 | 5/2010 | Parle et al. |
| 7,806,452 | B2 | 10/2010 | Storer et al. |
| 2001/0026756 | A1 | 10/2001 | Mortimore |
| 2005/0105995 | A1 | 5/2005 | Freet et al. |
| 2006/0110230 | A1 | 5/2006 | Girardin |
| 2006/0269378 | A1 | 11/2006 | Panzarella et al. |
| 2007/0057499 | A1 | 3/2007 | Fengel et al. |
| 2007/0269301 | A1 * | 11/2007 | Eekhoff ............. 414/543 |
| 2008/0023978 | A1 | 1/2008 | Luik |
| 2008/0079252 | A1 | 4/2008 | Shutter et al. |

OTHER PUBLICATIONS

Milford—Vehicle Load Restraint Guide—Int'l Ed. dated Oct. 27, 2005 (64 pgs).
Pride Silver Star Lifts—Backpacker Plus ad—dated Mar. 2007 (1 pg).
Vantage Mobility International—"The Elite G2" Not Dated (1 pg).
Vantage Mobility International—"Scooter & Wheelchair Lift—Elite G2" Not Dated (2 pgs).
Ledwell & Son Enterprises, Inc.—Ledwell Medium Duty Rollback; 2006 (4 pgs).
Jerr-Dan Towing & Recovery Technologies—Best in Class Standard Duty Steel Carriers; Jun. 2004 (6 pgs).
Jerr-Dan Run Hard—Aluminum and Steel Carriers; Nov. 2006 (24 pgs).
Jerr-Dan Run Hard—Industrial Rollback Carriers; Jan. 2006 (6 pgs).
Jerr-Dan Towing & Recovery Technologies—Pioneer Series Aluminum Carriers; Jun. 2004 (6 pgs).
Q'Straint—Safety World Wide World Class The Ultimate Wheelchair and Occupant Restraint System—No Publication Date Provided (4 pgs).
Pride Mobility Products Corp.—Backpacker Owner's Manual Apr. 2006 (23 pgs).
Q'Straint—Buying Resource Guide—No Publication Date Provided (17 pgs).
Q'Straint—QLK-100 Product Information—No Publication Date Provided (2 pgs).
Q'Straint—QLK-150 Product Information—No Publication Date Provided (2 pgs).
Milford—Choose to live . . . choose Milford—Vehicle Load Restraint Product Range—No Publication Date Provided (2 pgs).
Harmar—AL650 Automatic Hybrid Platform Lift—No Publication Date Provided (1 pg).
Harmar Mobility—Installation and Owner's Manual—AL690 Side-Door Hybrid Lift, AL600 Universal Hybrid Lift, AL650 Hybrid Pwerchair [sic] Lift w/Docking Station—No Publication Date Provided (19 pgs).
Freedom Lift Corporation—Tracker Series brochure—No Publication Date Provided (2 pgs).
EZ Lock—Guide to Docking System Operation—for the EZ Lock BL-6290 and BL-7317 Docking Bases—Copyright notice "2008" (1 pg).
EZ Lock—We Know Wheelchair Docking Systems—Copyright notice "2010" (3 pgs).
EZ Lock—We've got the lock on safety and freedom—Copyright notice "2010" (1 pg).
EZ Lock—Product Guide and Compatibility Chart 2010 (11 pgs).

* cited by examiner

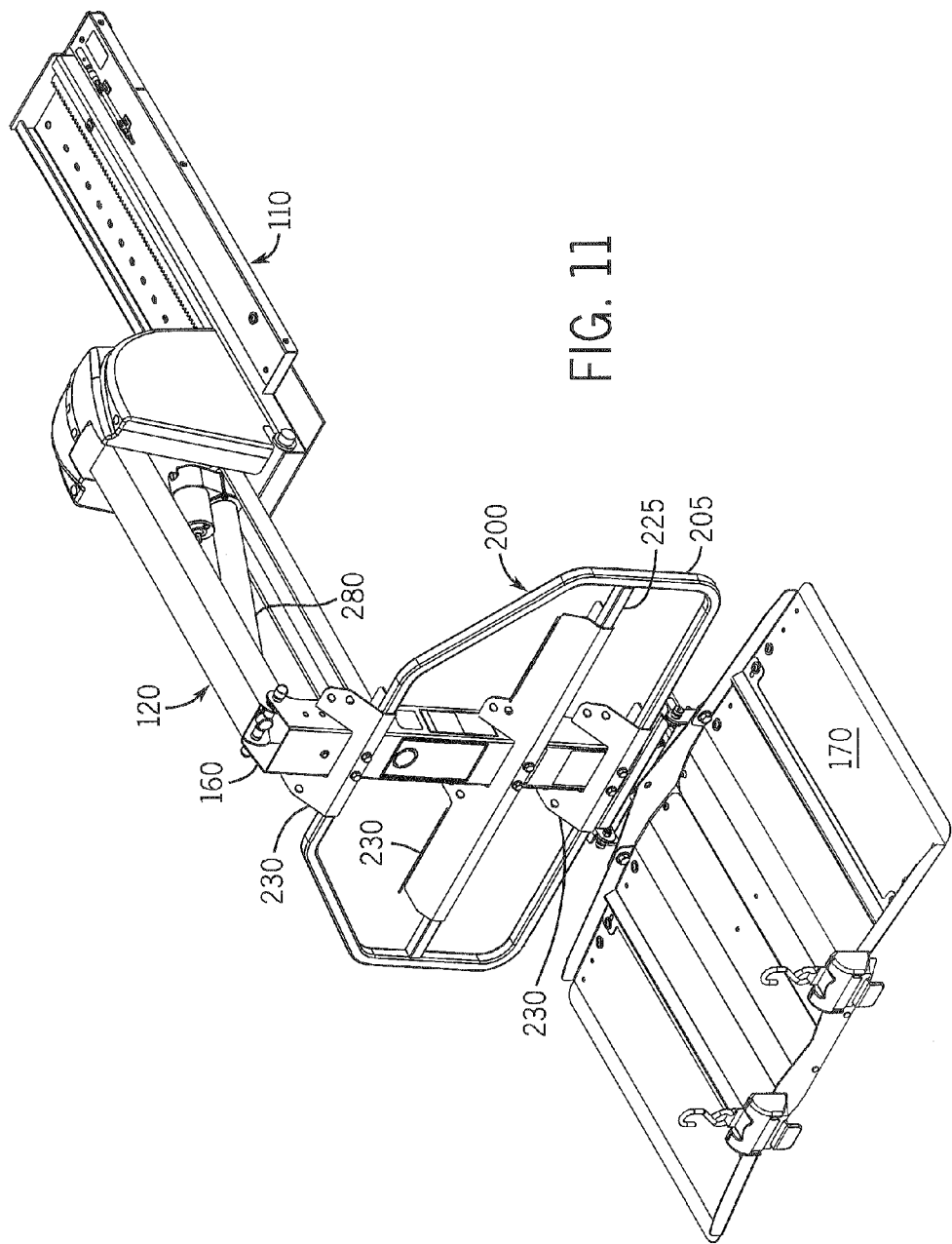

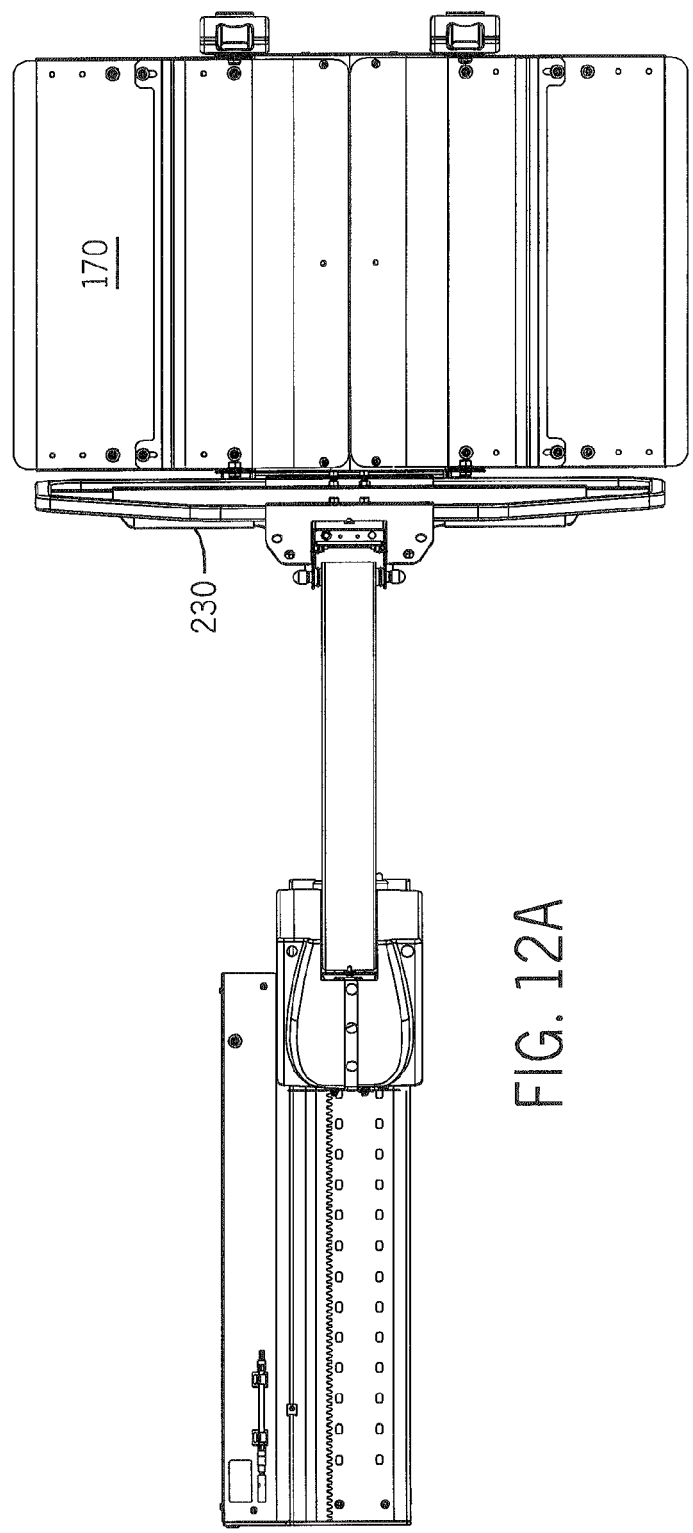

VEHICLE LIFT BARRIER

CROSS-REFERENCE TO RELATED APPLICATIONS

This application claims the benefit of priority under 35 U.S.C. §119(e) and any other United States or other law of the following: U.S. Ser. No. 61/090,309 filed 20 Aug. 2008, entitled VEHICLE LIFT BARRIER, the entire disclosure of which is incorporated herein by reference in its entirety for all purposes.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable.

BACKGROUND

1. Technical Field

The present invention relates generally to lifts used in various types of motor vehicles and the like.

2. Description of Related Art

It often is desirable to assist a user in lifting cargo into and out of motor vehicles, such as minivans, hatchback motor vehicles, etc. In particular, many people use motor vehicles to transport mobility devices such as scooters, power chairs and the like. A number of earlier lifts and accompanying systems are mountable in the cargo and/or storage area(s) of such motor vehicles.

Current vehicle lifts provide two types of securement. "Active" securement systems typically require manual attachment of belts or straps to the mobility device or other cargo. In such active securement systems, additional hardware must be installed on the mobility device to provide attachment points on the cargo itself. "Passive" securement systems, such as docking-type tie-down arrangements, are actuated when the mobility device rolls into the proper position on the platform. These passive systems require special hardware adapted to the particular mobility device or cargo.

Apparatus, systems, methods and techniques that provide improved passive protection for occupants in a motor vehicle passenger area from shifting cargo in the motor vehicle's storage area, without requiring adaptation hardware, would represent a significant advancement in the art.

SUMMARY

Embodiments of the present invention include apparatus adapted to assist in loading and unloading cargo (for example, mobility devices and the like in some cases), and to provide a storage environment in which the cargo is less likely to migrate from a storage area (for example, the cargo area of a minivan or SUV) into a passenger seating area such as the first or second row of seats in a motor vehicle. In some embodiments, a barrier composed of a barricade that is mounted to a vehicle lift, for example by being mounted to a generally vertical post, mast or the like, being mounted to a lift platform, or in any other suitable fashion that allows the lift to operate normally, while the barricade obstructs all or a substantial portion of the passage between the motor vehicle storage/cargo area and the passenger area. Where the barrier is mounted to a vertical post or the like on a vehicle lift, cut-out bracketing can be used to mate with the outer cross-sectional shape of the post, thus inhibiting pivoting of the barrier about the post. Such embodiments provide a simple, relatively inexpensive apparatus for better protecting passengers, property, etc. in the passenger compartment or area and can be retrofitted easily into many motor vehicles. Embodiments of the present invention can be deployed in motor vehicles with rear and/or side access-ways where vehicle lifts typically are provided and do not require special tie-downs or other cargo securing means, making such embodiments especially useful in vehicles that might serve a number of different passengers and/or types of cargo, mobility devices, etc. (for example, taxis, limousines and the like).

BRIEF DESCRIPTION OF THE DRAWINGS

The present invention will be readily understood by the following detailed description in conjunction with the accompanying drawings, wherein like reference numerals designate like structural elements, and in which:

FIG. 11 is an isometric view of one or more embodiments of the present invention with the vehicle lift in a fully deployed position.

FIGS. 12A, 12B and 12C are top, side and front views, respectively, of one or more embodiments of the present invention with a vehicle lift in a fully deployed position.

DETAILED DESCRIPTION

Figure 1:
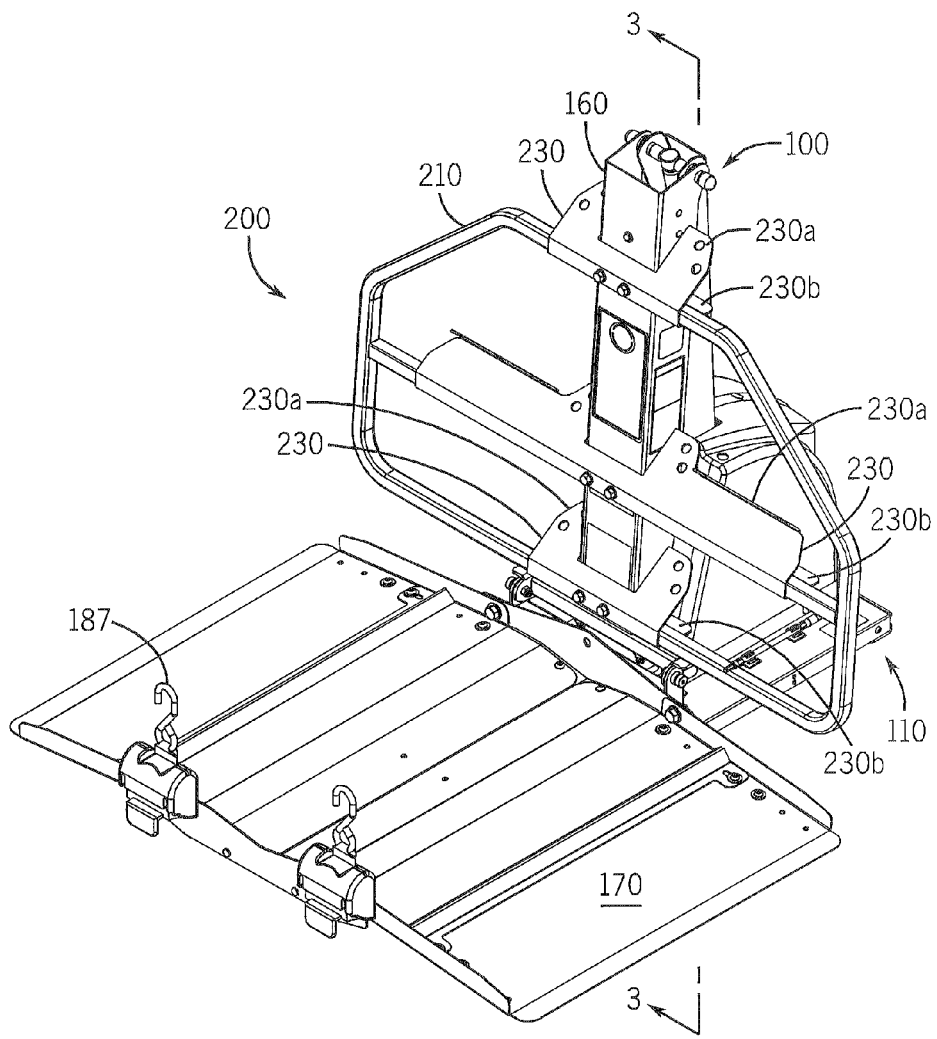
FIG. 1 is an isometric view of one or more embodiments of the present invention.

The following detailed description of the invention will refer to one or more embodiments of the invention, but is not limited to such embodiments. Rather, the detailed description is intended only to be illustrative. Those skilled in the art will readily appreciate that the detailed description given herein with respect to the Figures is provided for explanatory purposes and that the invention extends beyond these limited embodiments.

Certain terms are used throughout the description and claims to refer to particular components. As one skilled in the art will appreciate, like components may be referred to using different names, but this disclosure does not intend to distinguish between components that differ in name but not function. In the following discussion and in the claims, the terms "including" and "comprising" are used in an open-ended fashion, and thus should be interpreted to mean "including, but not limited to . . . " Phrases such as "coupled to" and "connected to" and the like are used herein to describe a connection between two devices, elements and/or components and are intended (unless otherwise restricted specifically) to mean physically and/or electrically either coupled directly together, or coupled indirectly together, for example via one or more intervening elements, components or connections, where appropriate.

One or more embodiments of the present invention include a cargo barrier that is configured to be or is affixed to a vehicle platform lift or the like in the cargo area of a motor vehicle. The vehicle lift has a generally laterally-centered vertical post (that is, an upright post centered in a "side-to-side" sense inside the motor vehicle) to which a barricade is secured in some embodiments. In other embodiments the barricade is secured to another component of the lift, for example the lift platform. The barricade may be attached in a manner that not only physically blocks cargo from moving out of the cargo area and into the passenger area, but also is fixed to the vehicle lift in a manner that resists twisting from torque forces applied to the barricade during use. The vehicle lift barrier is especially useful in motor vehicles like minivans, sport utility vehicles (SUVs), and other settings where there is little or no structure between occupants in the passenger area of the motor vehicle and cargo stored in the cargo area of the motor vehicle. Various embodiments of the vehicle lift barrier are appropriate for use in vehicles having rear entry doors/hatches and side entry doors/hatches.

Many motor vehicles currently come equipped with or are retrofitted to include one or more lifts or hoists that include a platform that can be used to assist in lifting cargo into and out of the motor vehicle. Typically these lifts are mounted in vans, minivans, hatchback motor vehicles and the like due to the layout and dimensions of the vehicles' cargo storage areas, as well as their larger access-ways, such as rear hatches, side entry doors, and the like. Such motor vehicles typically have a passage provided between the cargo area and the passenger area, for example space above the backs of one of the rows of seating in the motor vehicle, or space above folded down second row seats. Any such space permitting movement of objects between the cargo area and the passenger area is referred to herein as the "passage" between such areas.

Figure 3:
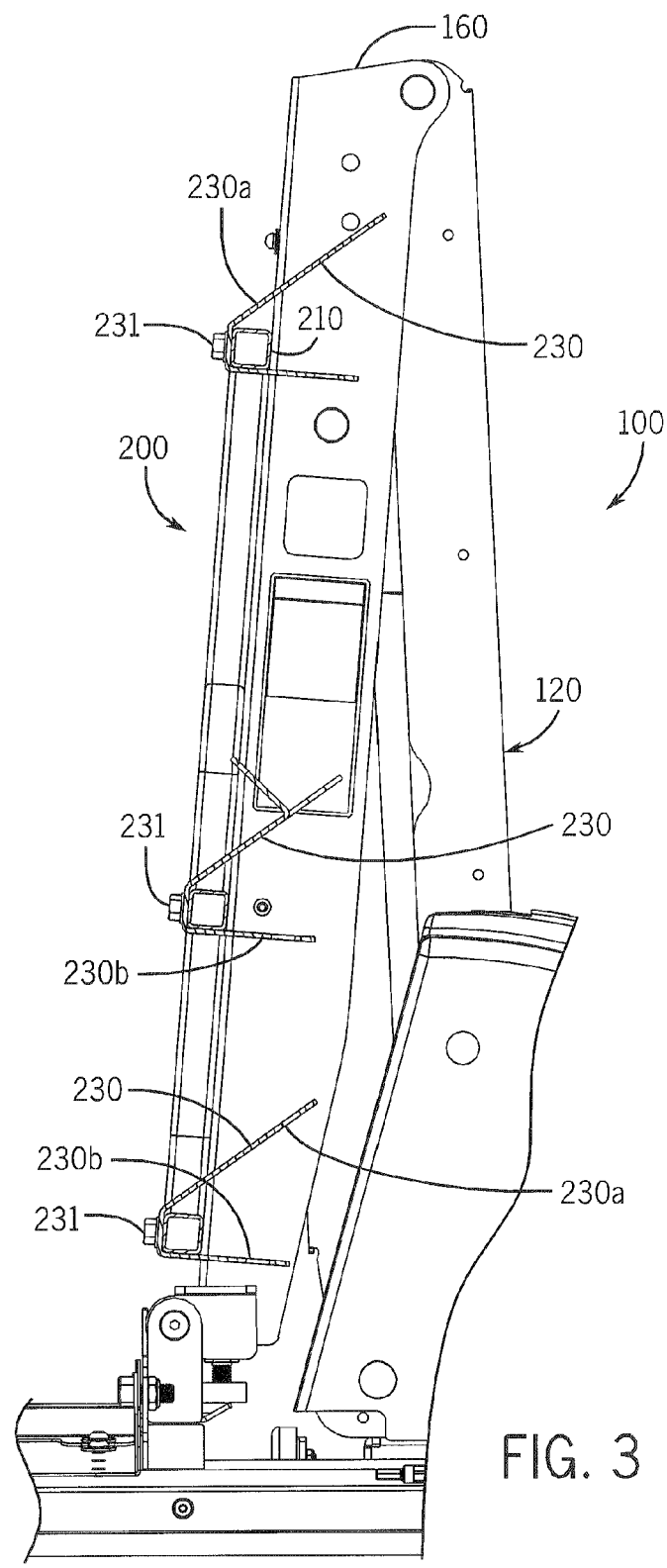
FIG. 3 is a cross-sectional view of one or more embodiments of the present invention taken along the line 3-3 of FIG. 1.

One or more embodiments of the present invention are illustrated in FIG. 1 and other Figures, which show a lift 100 using a generally vertical post 160 (or "mast" or other vertical structure) typically mounted approximately in the lateral (that is, vehicle side-to-side) center of the cargo area. As is well known to those skilled in the art, lateral/central mounting assists in maintaining a laterally balanced load on a lift platform or the like. See, for example, figures in United States Publication No. 2001/0026756 and United States Publication No. 2005/0105995 (both of which are incorporated herein by reference for all purposes). It is interesting to note that FIGS. 1 and 3 of the 2005/0105995 document illustrate the exposure of the passenger area to shifting cargo through a passage from the cargo area when embodiments of a vehicle lift barrier according to the present invention are not used.

Operation of lift 100 basically includes horizontal movement of a reciprocating horizontal slide mechanism 110 and vertical movement of a platform 170 controlled by a vertical linkage mechanism 120 (further details regarding operation of such a lift can be found in the 2001/0026756 document). In other lift configurations, the reciprocating horizontal slide mechanism is coupled with a telescoping vertical lift platform, as seen in the 2005/0105995 document and in U.S. Pat. No. 6,726,435 (which is incorporated herein by reference for all purposes). A variety of other lift configurations usable in and with embodiments of the present invention are well known to those skilled in the art.

Figure 12B:
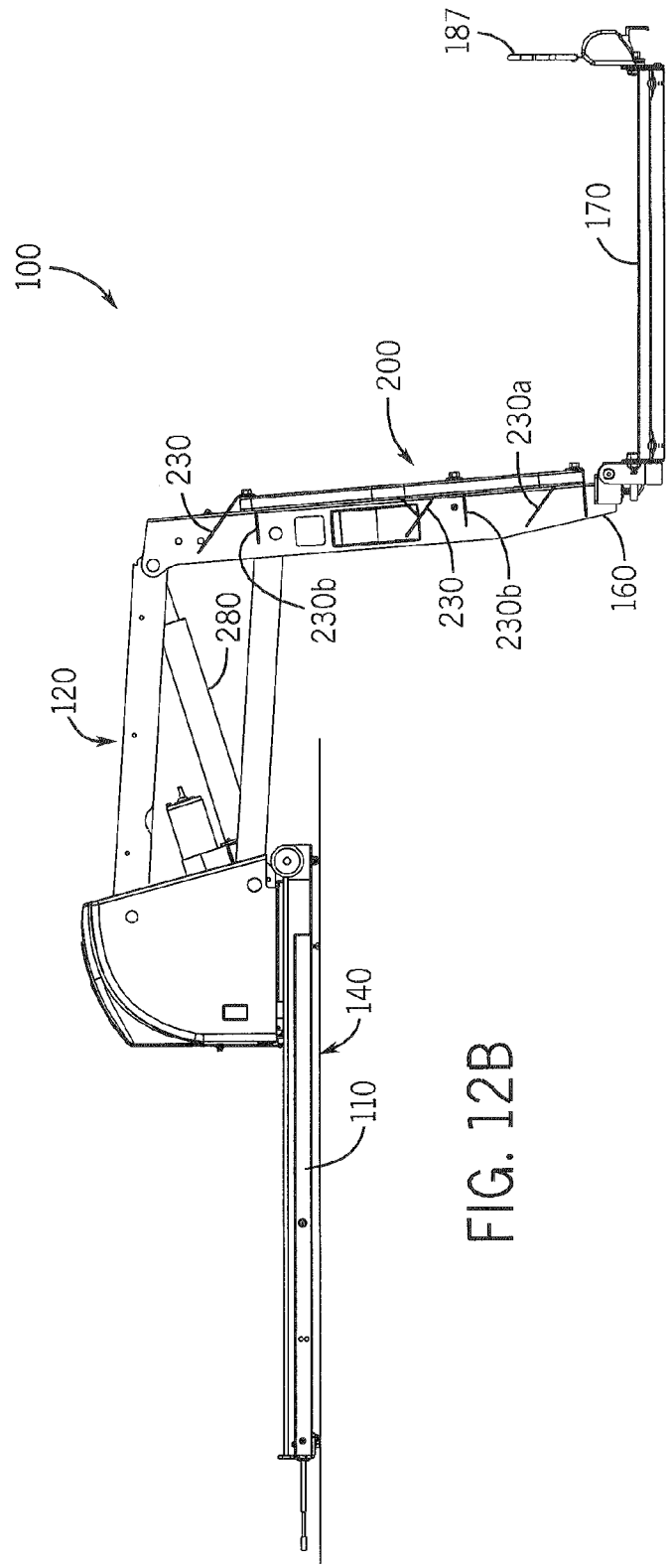
Figure 12C:
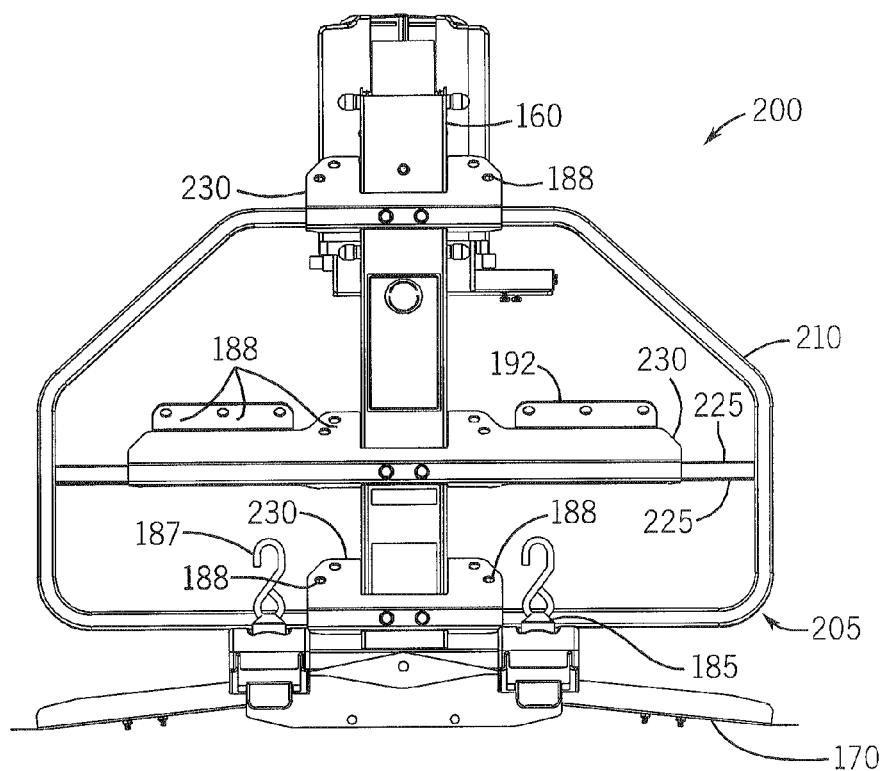
Figure 13:
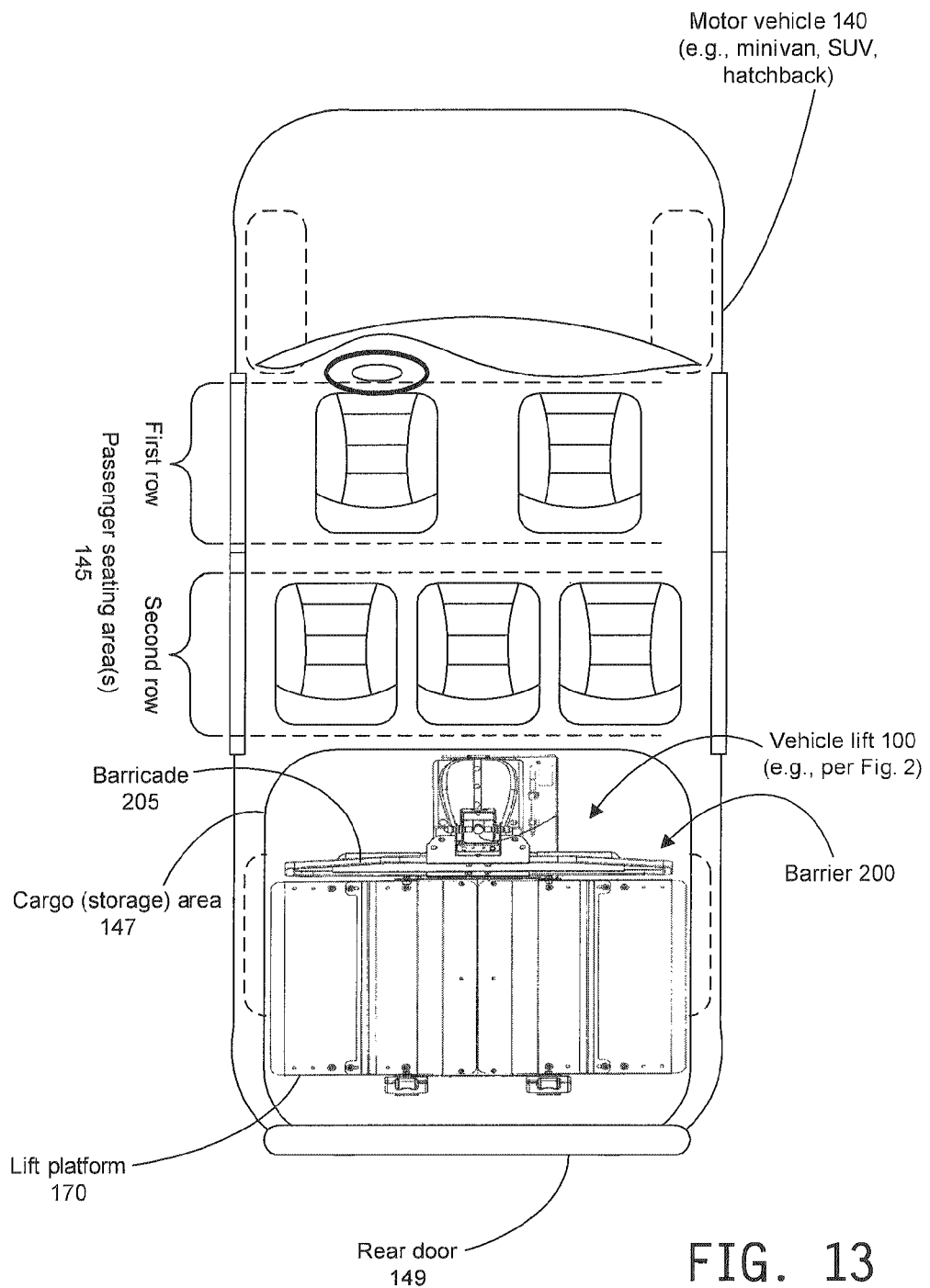
FIG. 13 illustrates one or more embodiments of a vehicle lift barrier mounted in a motor vehicle 140 (e.g., a minivan, SUV or hatchback having a rear door 149) having a motor vehicle passenger seating area 145 (e.g., first and second rows of seating) forward of a motor vehicle cargo area 147 (also referred to as a storage area) in which a vehicle lift 100 having a vehicle lift barrier 200 is mounted, wherein the vehicle lift 100 includes a vehicle lift platform 170, and further wherein the vehicle lift barrier 200 includes a barricade 205 (e.g., the vehicle lift device and vehicle lift barrier with barricade shown in FIGS. 2 and 12B).

When a vehicle lift (mounted adjacent either a rear or side entryway) is in its fully deployed position, as shown in FIGS. 12A, 12B and 12C, the vertical lifting mechanism is lowered so that the lift platform is on the ground or other support surface and any horizontal mechanism is typically fully extended toward the outside of the vehicle. When the lift is partially deployed, the horizontal slide is fully extended, but the vertical lifting mechanism is in a raised position. Finally, when a lift is in a fully retracted position, as shown in FIGS. 1, 10A, 10B and 10C, the horizontal slide is completely retracted inside the motor vehicle cargo area and the vertical lifting mechanism is fully raised. (In configurations using a combined horizontal/vertical mechanism or the like, a fully deployed platform is as far "out" and "down" as normal travel path permits)

In FIG. 11 the vertical linkage 120 of lift 100 includes generally vertical post 160. In some lifts, this type of post 160 or other vertical structure (also sometimes referred to as a "column," "arm," "mast" or the like) may be stationary (that is, immovably mounted to the interior structure of the cargo area of a motor vehicle 140, the motor vehicle's frame or other appropriate mounting point(s)). In other situations, post 160 moves during use to assist in transferring a platform 170 or the like into and out of the storage space of a motor vehicle 140 for loading and unloading cargo. In these lifts, however, the vertical post 160 maintains a generally vertical orientation throughout operation of the lift, from a fully retracted position (whether loaded or empty) in the motor vehicle cargo area to a fully deployed position where the lift is in a loading orientation outside the motor vehicle.

In the example of FIGS. 9, 10A, 10B and 10C, a scooter, power chair 180 or other cargo is loaded on platform 170 (a scooter or power chair is a type of personal mobility vehicle used by an individual who is physically challenged). Moreover, the vertical post 160 might also be a formed plate that pivots during operation, thus potentially having 3 sides, such as the plate shown in the 2001/0026756 document. Any of these vertical structures (for example, a unitary vertical structure, a generally vertical assembly such as that shown in the aforementioned patent publication, or a single or multi-stage telescoping mast structure, as shown in the 2005/0105995 and 6,726,435 documents) are deemed to be "vertical posts" and/or equivalents thereto for mounting a barricade or the like according to one or more embodiments disclosed and/or claimed herein. Platforms in these types of lifts are typically strong, rigid metal sheets or assemblies that are configured to hold up to several hundred pounds and to maintain cargo in a generally horizontal orientation during extension/lowering, retraction/raising and transportation of the cargo in the motor vehicle.

In earlier lift devices and systems, once a scooter or other cargo 180 was loaded on platform 170 inside the cargo area of the motor vehicle 140, post 160 typically was the only structure (if any) interposed between the cargo in the cargo area and someone or something in the passenger area. Cargo might be tied down and/or otherwise secured to platform 170 and/or some other structure. However, restraints, tie-downs, etc. can fail or not be used at all, thus allowing the cargo to move about freely in the motor vehicle interior, especially when the motor vehicle decelerates quickly or turns suddenly. Where the cargo area is openly connected to a passenger area or the like, freely moving cargo (for example, a scooter or power chair) represents a potentially serious hazard to motor vehicle occupants. The center post 160 often is not tall enough or wide enough to prevent cargo from migrating from the cargo area to the passenger area.

Figure 2:
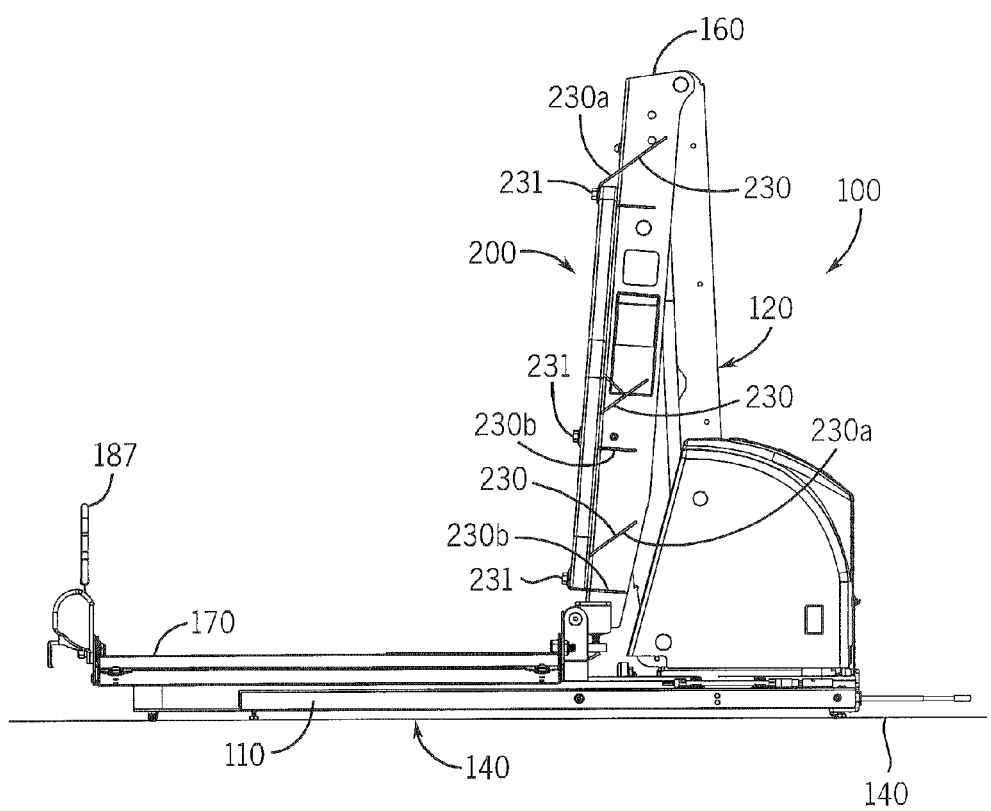
FIG. 2 is a side view of one or more embodiments of the present invention.

One or more embodiments of a vehicle lift barrier 200 are illustrated in Figure and other Figures. Barrier 200 is mounted to the motor vehicle lift 100 to interpose and maintain barrier 200 between the passenger area of the motor vehicle 140 and any cargo on the lift platform 170 or otherwise stowed in the cargo area of the motor vehicle 140. In the embodiment shown in FIGS. 2 and 3, the barrier 200 is mounted to the lift post 160.

Figure 4:
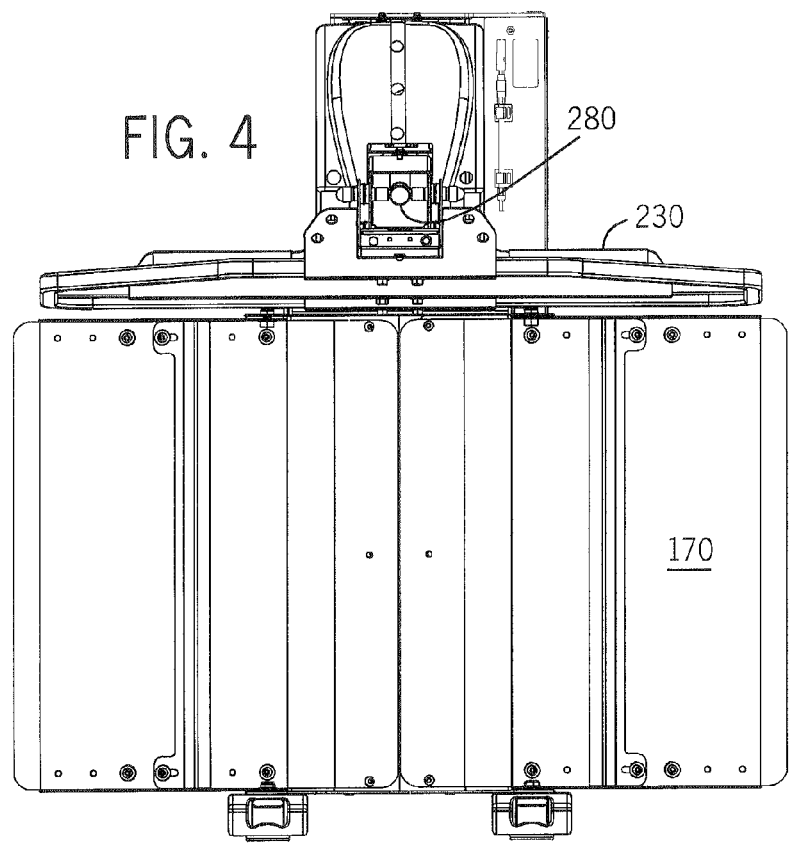
FIG. 4 is a top view of one or more embodiments of the present invention.
Figure 5:
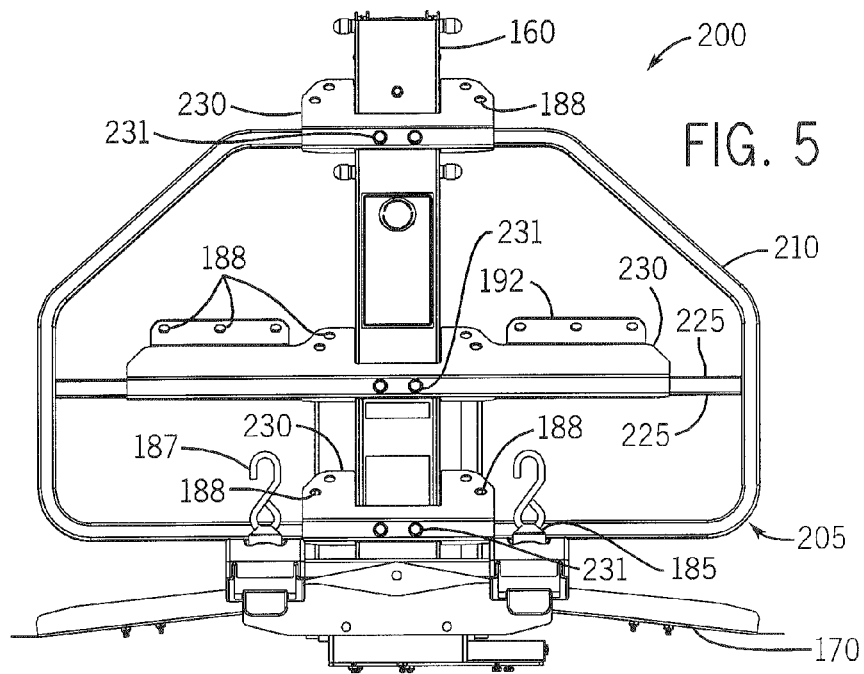
FIG. 5 is a front view of one or more embodiments of the present invention.
Figure 6:
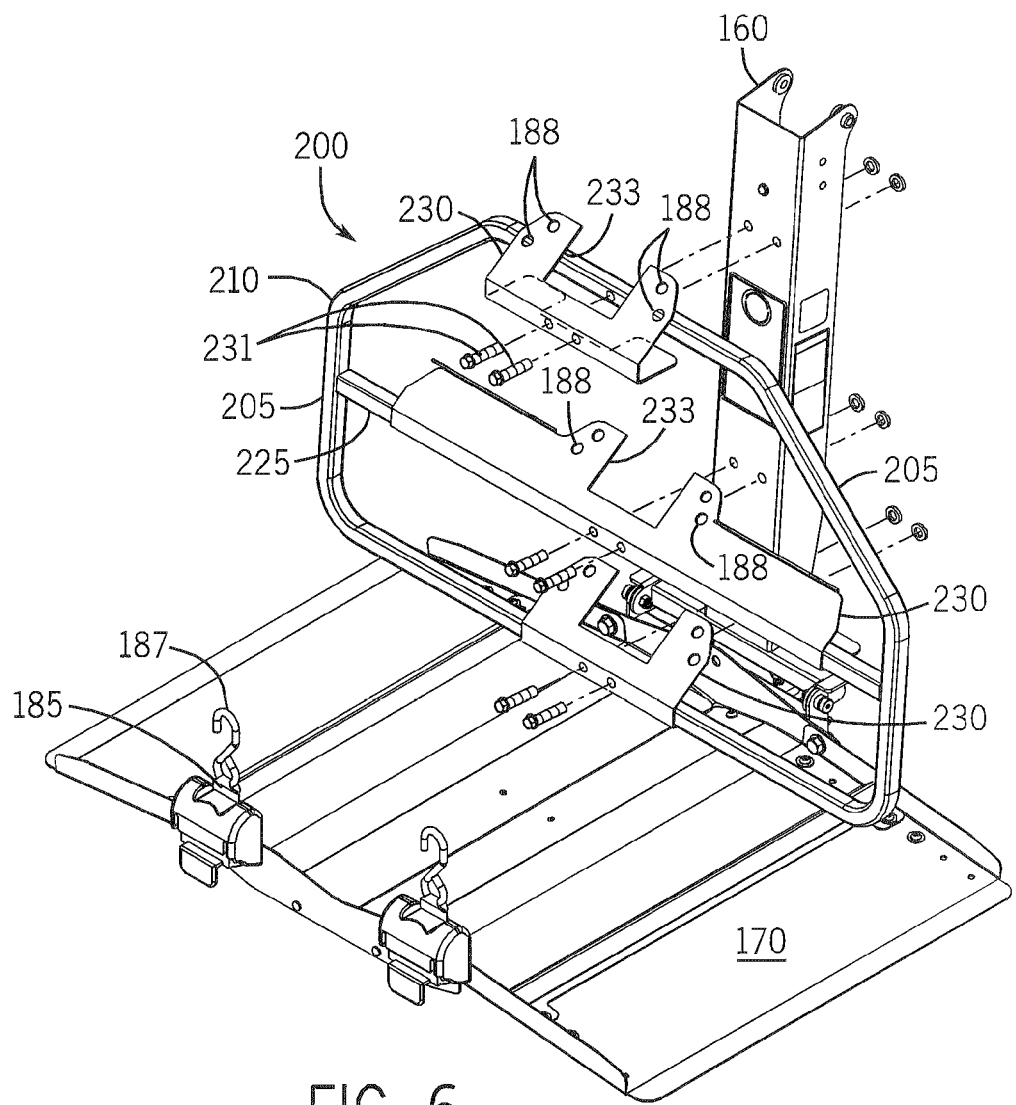
FIG. 6 is an exploded isometric view of one or more embodiments of the present invention.

In some embodiments the barrier 200 uses one or more brackets 230 to both secure the barrier 200 to post 160 of lift 100 and to reinforce the barrier 200 against rotation when a force is applied to the barrier 200 (for example, a torque applied when cargo pushes against an off-center component of the barrier 200). As seen in FIG. 6, for example, barrier 200 includes a barricade 205 (also referred to as a "blocking means") that is physically interposed between cargo and the post 160. In some embodiments of the present invention, the barricade 205 includes a frame 210 that is made of tubular steel and defines the perimeter of the barricade. The cross-section of the steel tube of frame 210 is square, though solid (non-hollow) frame members, other cross-sectional configurations and other materials can be used, as will be appreciated by those skilled in the art. Frame 210 is shaped as a planar hexagon in the embodiment of FIG. 6, though again other configurations will be apparent to those skilled in the art. One or more cross-members 225 extend laterally across frame 210 in the embodiment of FIG. 6, supplementing the upper and lower horizontal cross-members of the frame 210. One or more of such cross-members can be used as part of the barricade and can extend in any appropriate orientation(s) within and outside the frame 210. Each bracket 230 is welded to its cross-member to provide rigidity, which is further enhanced when each horizontal cross-member is bolted to the vehicle lift vertical post using bolts passing through both the frame cross-member and the associated/welded bracket 230. As can be seen in the embodiment(s) of FIGS. 4 and 9B, the bolts in such cases are spaced apart so that they do not interfere with an actuator 280 used to move the four bar linkage that controls extension and retraction of the vehicle lift platform 170. As a result of being wrapped around its associated cross-member, each bracket 230 has two generally planar flanges upper flange 230a and lower flange 230b—that provide mounting points for securing belts and the like and enhance the rigidity of each bracket 230 against rotation by reinforcing the cut-out profile in each bracket 230. The two-flange construction also improves rigidity against rotation when the cut-outs of each bracket 230 engage the vehicle lift post 160.

As seen in FIGS. 1 and 6, brackets 230 rigidly secure the barricade 205 to the post 160 and reinforce the barricade 205 against rotation about the post 160 (for example, as opposed to having a plurality of bolts or the like bear all such torque/twisting forces). In the embodiment(s) shown in FIGS. 1-6, a bracket 230 secures the barricade 205 (frame 210 and any cross-member 225) to post 160 using bolts 231 that pass through the bracket 230, the frame 210 or cross-member 225. As seen most clearly in the exploded view of FIG. 6, each securing bracket 230 has a square cut-out 233 that substantially mates with the external cross-sectional shape of post 160. The combination of the bracing of cut-outs 233 and the way each bracket 230 wraps around the frame 210 or a cross-member 225 in an almost C shape adds strength, rigidity and stability to the vehicle lift barrier's ability to prevent cargo from breaching the barricade 205. As will be appreciated by those skilled in the art, other cross-sectional shapes and mating bracket cut-outs can be used, though the square configuration shown in FIG. 1 and other Figures is both simple to fabricate and assemble, as well as being highly effective in withstanding torque forces applied to the barricade 205 during use.

Figure 7:
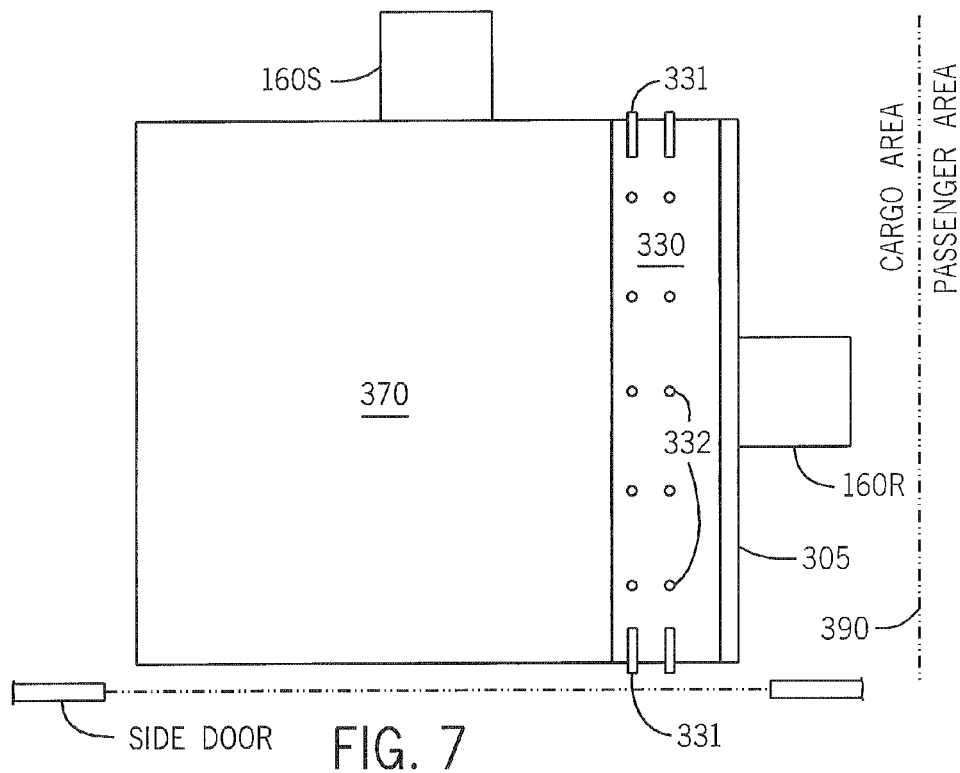
FIG. 7 is a top view of one or more embodiments of the present invention.
Figure 8:
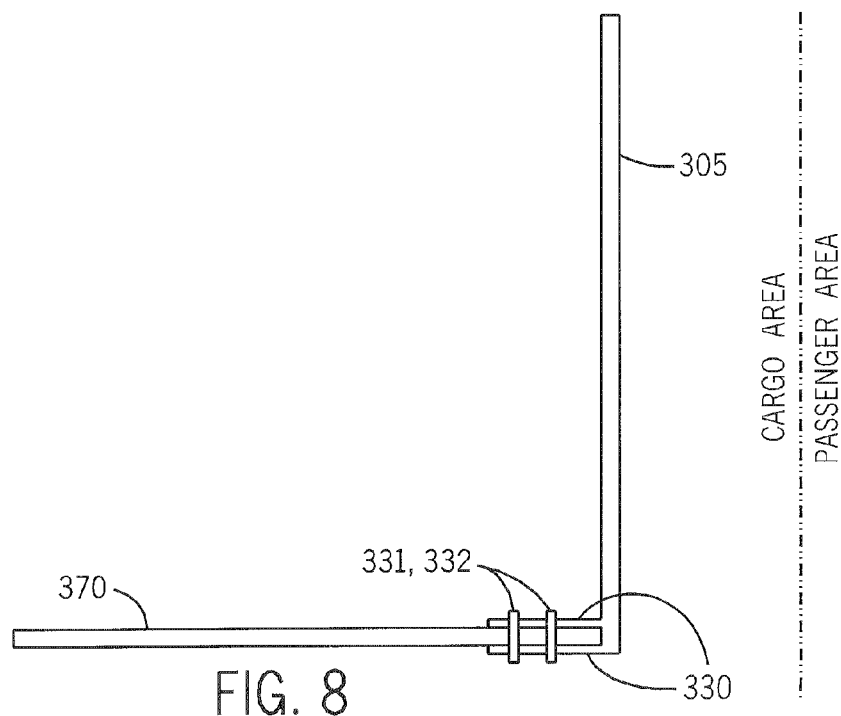
FIG. 8 is a side view of one or more embodiments of the present invention.
Figure 9:
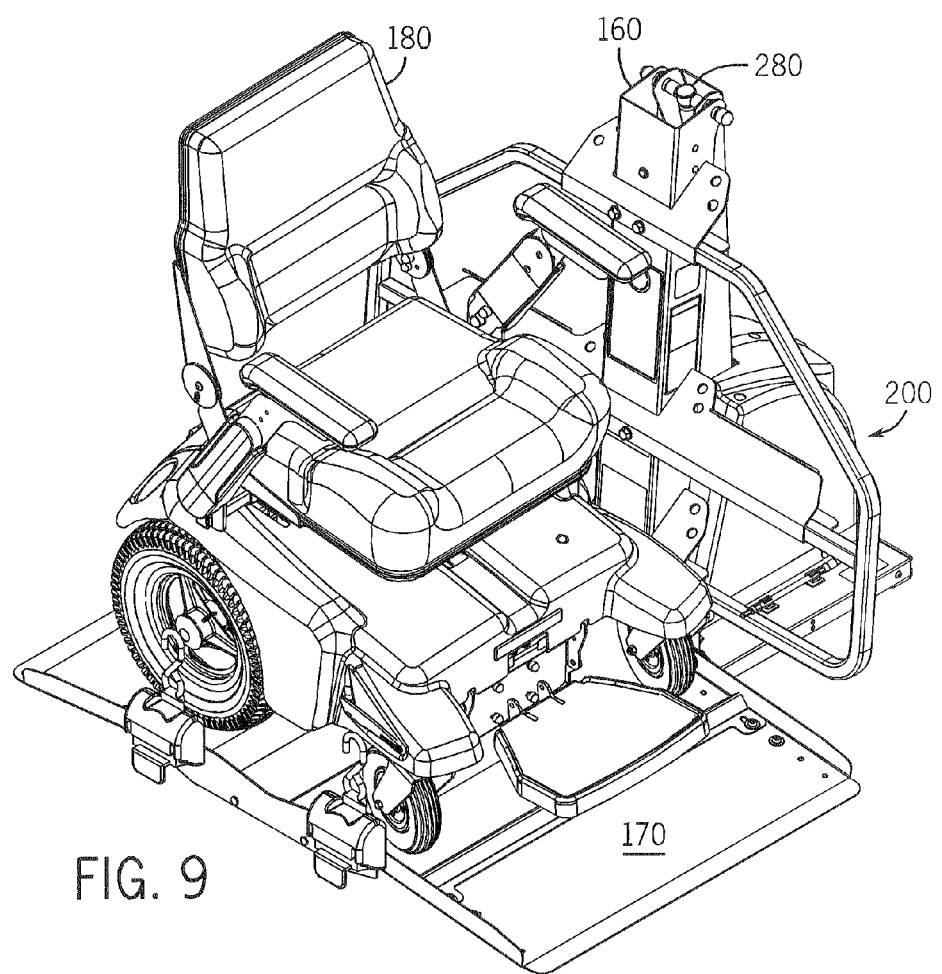
FIG. 9 is an isometric view of one or more embodiments of the present invention with the vehicle lift in a fully retracted position.
Figure 10A:
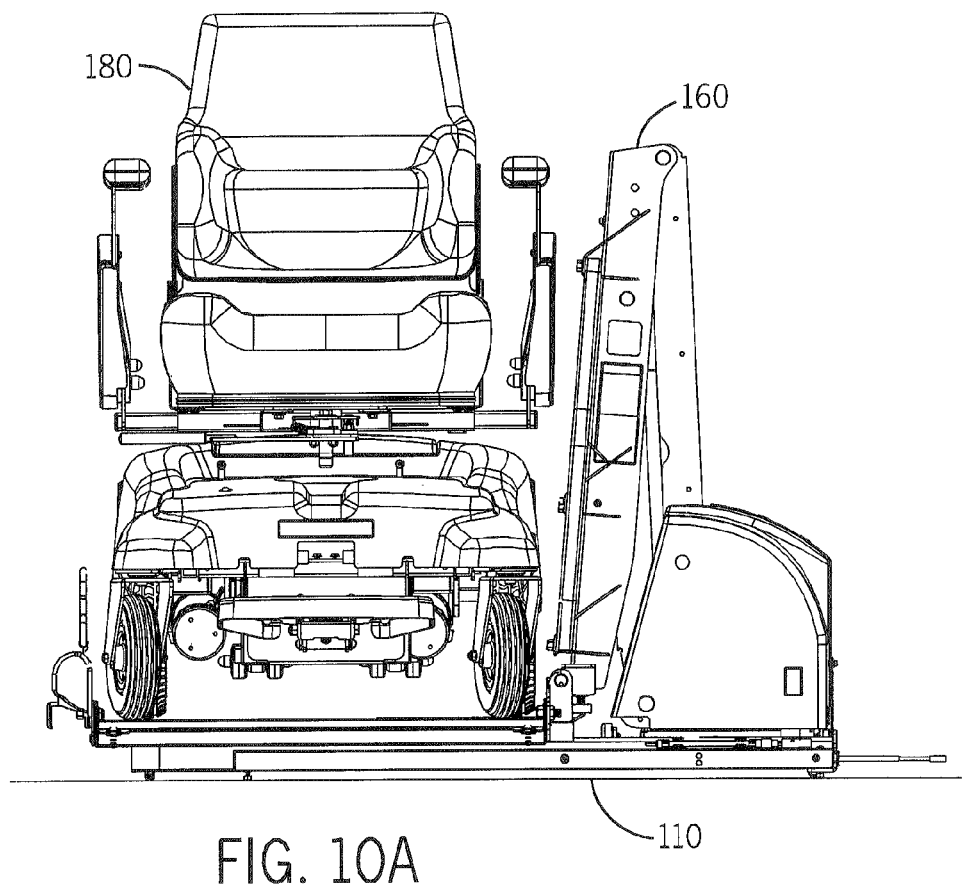
FIGS. 10A, 10B and 10C are side, top and front views, respectively, of one or more embodiments of the present invention with a vehicle lift in a fully retracted position.
Figure 10B:
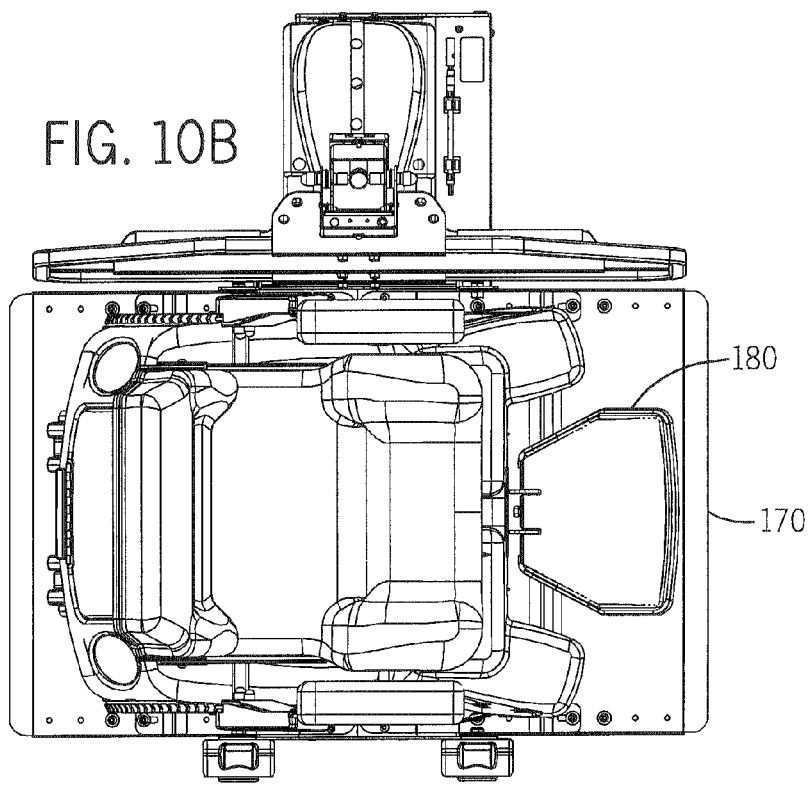
Figure 10C:
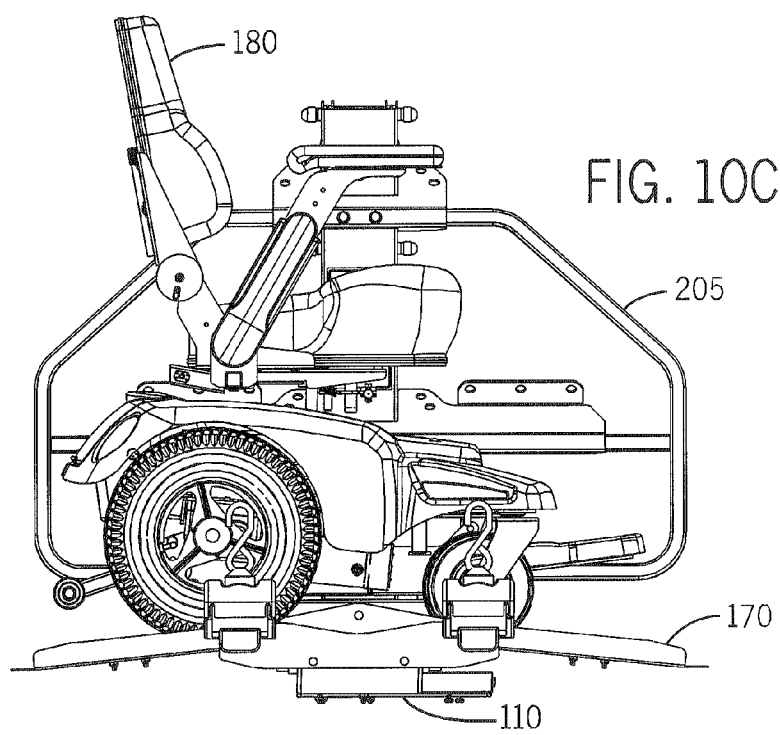

The vehicle lift barrier also can be attached directly to the lift platform of a given lift. In FIGS. 7 and 8, barricade 305 is rigidly secured to the lift platform 370. A C-shaped bracket 330 on barricade 305 engages the platform 370 either removably or permanently. A "removably" secured bracket (that is, one using "removable securing means" that includes bracket 330) is a bracket that can be put on or removed without tools or with common, simple tools (for example, manual clamps, simple nut and bolt configurations and screws are examples of such removable securing means). A "permanently" secured bracket (that is, one using "permanent securing means") is one that is not intended to be put on or removed during normal operation and use (for example, rivets, welding and locked bolts are examples of such permanent securing means). Permanent securing means for attaching barricade 305 to platform 370 are rivets 332 in FIG. 8. Removable securing means for attaching barricade 305 to platform 370 are clamps 331 that can be secured or removed manually or using a wrench or the like.

When bracket 330 engages platform 370, the barricade 305 is held in place not only by the securing means 331 and/or 332, but also is held against undesirable rotation or torque by the mating of bracket 330 and platform 370. Bracket 330 and cut-outs 233 can each (or collectively) be referred to as "bracing means" in connection with embodiments of the present invention, being structures that help brace the barricade against undesirable rotation due to torque forces applied to the barricade during use.

As can be seen in FIG. 7, platform-mounted barrier embodiments can be configured for or used in rear door or side door entryways. If a side door entry is used in a motor vehicle, then a mast 160S is laterally opposed across the cargo area from the side doorway 141. In this setting with mast 160S, mounting the barricade to the mast or other vertical support would be generally ineffective in protecting occupants in the passenger area because the post is not between the cargo area and passenger area (demarcated by line 390 in FIGS. 7 and 8). Therefore, in these embodiments, the barricade is instead mounted to the lift platform on an edge perpendicular to the platform edge adjacent to the mast. The barricade 305 is still maintained in a position between the motor vehicle cargo area and passenger area, despite the side offset of mast 160S. Where a side door lift uses a mast mounted to the side of the horizontal direction of movement of the horizontal slide mechanism, that mast occupies a position between the passenger area and cargo area and would therefore be a suitable mounting location for a barrier. If used in a rear door entryway of a motor vehicle, then mast 160R can be used opposite the rear entryway. Again, the platform-mounted barricade 305 is still maintained between the motor vehicle's cargo area and passenger area.

In all platform-mounted barrier embodiments, the platform's rigid structure can be used with removable or permanent securing brackets or other securing means to brace the barrier against rotation, again protecting occupants in the passenger area more effectively than if no barrier were present. Moreover, these configurations, like the above-described configurations, also provide this more effective protection without having to modify the cargo's structure (for example, adding a post or other connector onto a scooter or the like) and/or the platform's structure (again, for example, by adding a post or other connector). These configurations thus provide effective protection for all scooters, power chairs, general cargo, etc. that might by transported as cargo in the motor vehicle. This is especially helpful in motor vehicles that are used to transport a variety of personal mobility devices—for example, taxicabs, limousines and other vehicles might encounter a variety of scooters, power chairs, etc. and embodiments of the present invention permit safer transportation of such devices without requiring individualized lift equipment for each such device.

When a scooter, power chair or other cargo is on platform 170, one or more belts 185 can be used to help secure the cargo to the platform 170. Each belt 185 uses a hook 187 to secure the free end of a belt 185 to an appropriate anchoring point, for example on a mobility device, on the barrier, and/or at any other appropriate location. In the embodiment of the vehicle lift barrier 200 shown in FIGS. 5 and 6, belt anchoring points 188 are provided in the vehicle lift barrier 200 at a number of locations. These include holes 188 in one or more of the brackets 230, including holes adjacent the post 160 as well as holes 188 located on a flange 192 or the like on one or more of the brackets 230. Other belt anchoring points can be provided and are not restricted only to holes.

In motor vehicles using embodiments of the vehicle lift barrier, occupants are better protected against cargo movement toward and/or into the passenger area or compartment, even if cargo-securing belts are not available or used. The vehicle lift barrier provides a simple, inexpensive and effective barrier (whether as original equipment or as a retrofitted component) between cargo in a motor vehicle cargo area and occupants in the passenger compartment.

The many features and advantages of the present invention are apparent from the written description, and thus, the appended claims are intended to cover all such features and advantages of the invention. Further, since numerous modifications and changes will readily occur to those skilled in the art, the present invention is not limited to the exact construction and operation as illustrated and described. Therefore, the described embodiments should be taken as illustrative and not restrictive, and the invention should not be limited to the details given herein but should be defined by the following claims and their full scope of equivalents, whether foreseeable or unforeseeable now or in the future.

What is claimed is:

1. A vehicle lift configured to be mounted in a rearward interior cargo area of a motor vehicle adjacent to a motor vehicle rear access-way, wherein the motor vehicle comprises the rearward interior cargo area and a passenger seating area forward of the rearward cargo area, the lift comprising:
    a platform movable between a stored position within the rearward interior cargo area and a fully deployed position outside the motor vehicle, wherein movement of the platform between the stored position and the fully deployed position comprises movement of the platform through the motor vehicle rear access-way;
    a generally vertical post forward of and coupled to the platform, wherein the vertical post is configured to occupy an approximately central lateral position in the motor vehicle rearward cargo area forward of the platform when the platform is in the stored position; and
    a vehicle lift barrier comprising:
        a barricade mounted to the post, wherein the barricade is maintained on the post in a position forward of the platform and rearward of the motor vehicle passenger seating area; and
        one or more brackets securing the barricade to the post, wherein each bracket comprises a cut-out engaging an external cross-section of the vertical post to resist twisting of the barricade due to torque forces applied to barricade;
    wherein the barricade is configured to physically block cargo from moving forward out of the cargo area and into the passenger area.

2. The vehicle lift of claim 1 wherein the rearward interior cargo area is situated between a rearmost row of passenger seats in the motor vehicle and the motor vehicle rear access-way.

3. The vehicle lift of claim 2 wherein the barricade comprises a metal frame and a plurality of cross-members mounted to the frame and extending laterally across the frame.

4. The vehicle lift of claim 3 wherein at least one of the one or more brackets wraps around at least one of the plurality of cross-members and further wherein each bracket comprises a first flange having one of the cut-outs formed therefrom.

5. The vehicle lift of claim 4 further wherein each bracket comprises a second flange having one of the cut-outs formed therefrom.

6. The vehicle lift of claim 5 wherein the barricade is mounted to the post using a first bolt passing through a first bracket and passing through one of the plurality of cross-members around which the first bracket wraps.

7. The vehicle lift of claim 6 wherein the lift further comprises at least one of the following:
    a telescoping vertical lifting and lowering mechanism;
    a linkage-based vertical lifting and lowering mechanism.

8. The vehicle lift of claim 1 wherein the motor vehicle rear access-way comprises at least one of the following: a motor vehicle rear lift gate, a motor vehicle rear hatch, one or more motor vehicle rear doors.

9. The vehicle lift of claim 1 wherein the motor vehicle is one of the following: a minivan, a van, a hatchback motor vehicle, a sport utility vehicle.

10. A vehicle lift configured to be mounted in a rearward interior cargo area of a motor vehicle adjacent to a motor vehicle rear access-way, wherein the motor vehicle comprises the rearward interior cargo area and a passenger seating area comprising a row of passenger seats forward of the rearward cargo area, the lift comprising:
    a platform movable between a stored position within the rearward interior cargo area and a fully deployed position outside the motor vehicle, wherein movement of the platform between the stored position and the fully deployed position comprises movement of the platform through the motor vehicle rear access-way;
    a generally vertical post forward of and coupled to the platform, wherein the vertical post is configured to be located between the row of passenger seats and the platform and is configured to occupy an approximately central lateral position in the motor vehicle rearward cargo area forward of the platform when the platform is in the stored position; and a vehicle lift barrier comprising:
  a barricade mounted to the platform, wherein the barricade is maintained in a position forward of the platform and rearward of the motor vehicle row of passenger seats; and
  one or more brackets rigidly securing the barricade to the platform, wherein each bracket is configured to brace the barricade against rotation due to torque forces applied to barricade;
wherein the barricade is configured to physically block cargo from moving forward out of the cargo area and into the row of passenger seats.

11. The vehicle lift of claim 10 wherein each bracket is coupled to the platform using one of the following: removable securing brackets; permanent securing brackets.

12. The vehicle lift of claim 11 wherein the barricade is also rigidly mounted to the generally vertical post.

13. The vehicle lift of claim 11 wherein the lift further comprises at least one of the following:
  a telescoping vertical lifting and lowering mechanism;
  a linkage-based vertical lifting and lowering mechanism.

14. A vehicle lift configured to be mounted in a motor vehicle comprising a row of passenger seats and a cargo area having a floor, the cargo area comprising a rearward interior cargo area situated between the row of passenger seats and a motor vehicle rear access-way, the lift comprising:
  a platform movable between a stored position within the rearward interior cargo area and a fully deployed position outside the motor vehicle rear access-way, wherein movement of the platform between the stored position and the fully deployed position comprises movement of the platform through the motor vehicle rear access-way;
  a generally vertical post forward of and coupled to the platform, wherein the vertical post is configured to be mounted to the cargo area floor and to occupy an approximately central lateral position in the motor vehicle rearward cargo area forward of the platform when the platform is in the stored position, and further wherein the generally vertical post maintains a generally vertical orientation in the stored position and in the fully deployed position and during movement between the stored position and the fully deployed position;
  a vehicle lift barrier comprising:
    a barricade mounted to at least one of the platform and vertical post, wherein the barricade is rigidly secured and maintained in a position forward of the platform and rearward of the row of passenger seats, wherein the barricade comprises a metal frame and a plurality of cross-members mounted to the frame, wherein each cross-member extends generally laterally across the frame; and
    a plurality of brackets rigidly securing the barricade to at least one of the platform and vertical post, wherein each bracket is configured to brace the barricade against rotation due to torque forces applied to barricade;
  wherein the barricade is configured to physically block cargo from moving forward out of the cargo area and into the row of passenger seats.

15. The vehicle lift of claim 14 wherein the motor vehicle rear access-way comprises at least one of the following: a motor vehicle rear lift gate, a motor vehicle rear hatch, one or more motor vehicle rear doors.

16. The vehicle lift of claim 15 wherein the platform comprises a plurality of securable belts and further wherein the barrier comprises one or more belt anchoring points.

17. The vehicle lift of claim 14 wherein each bracket is coupled to the platform using one of the following:
  removable securing means comprising one or more of the following: manual clamps, a nut and bolt pairing; screws; or
  permanent securing means comprising one or more of the following: rivets, welding, locked bolts.

18. The vehicle lift of claim 14 wherein the lift further comprises at least one of the following:
  a telescoping vertical lifting and lowering mechanism;
  a linkage-based vertical lifting and lowering mechanism.

* * * * *